United States Patent
Bonnet et al.

(10) Patent No.: US 9,358,611 B2
(45) Date of Patent: Jun. 7, 2016

(54) SUPPORTING PLATE FOR A LASER SINTERING DEVICE AND ENHANCED SINTERING METHOD

(75) Inventors: Daniel Bonnet, St Georges sur Allier (FR); Arkadiusz Waszkiewicz, Olsztyn (PL)

(73) Assignees: COMPAGNIE GENERAL DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1048 days.

(21) Appl. No.: 13/505,112

(22) PCT Filed: Oct. 29, 2010

(86) PCT No.: PCT/EP2010/066536
§ 371 (c)(1),
(2), (4) Date: Jun. 21, 2012

(87) PCT Pub. No.: WO2011/054772
PCT Pub. Date: May 12, 2011

(65) Prior Publication Data
US 2012/0260492 A1    Oct. 18, 2012

(30) Foreign Application Priority Data

Nov. 3, 2009  (FR) .................... 09 57765

(51) Int. Cl.
*B22F 7/08*    (2006.01)
*B22F 3/105*   (2006.01)
*B22F 5/00*    (2006.01)
*B29C 67/00*   (2006.01)

(52) U.S. Cl.
CPC ............... *B22F 3/1055* (2013.01); *B22F 5/007* (2013.01); *B29C 67/0077* (2013.01); *B29C 67/0085* (2013.01); *B22F 7/08* (2013.01); *Y02P 10/292* (2015.11); *Y02P 10/295* (2015.11); *Y10T 29/49982* (2015.01)

(58) Field of Classification Search
CPC ...................................... B22F 3/1055
See application file for complete search history.

(56) References Cited

U.S. PATENT DOCUMENTS

| 4,927,992 A * | 5/1990 | Whitlow et al. | 219/121.65 |
| 5,753,274 A | 5/1998 | Wilkening et al. | |
| 6,269,540 B1 * | 8/2001 | Islam et al. | 29/889.7 |

(Continued)

FOREIGN PATENT DOCUMENTS

| DE | 10 2004 041633 A1 | 3/2006 |
| JP | 2004-162095 A | 6/2004 |

(Continued)

OTHER PUBLICATIONS

International Search Report (PCT/ISA/210) issued on Feb. 16, 2011, by European Patent Office as the International Searching Authority for International Application No. PCT/EP2010/066536.

*Primary Examiner* — George Wyszomierski
*Assistant Examiner* — Ngoclan T Mai
(74) *Attorney, Agent, or Firm* — Dickinson Wright PLLC

(57) ABSTRACT

Sintering device comprising a laser source, the light power of which is capable of selectively melting successive layers of metal powders, and a reference plate on which the first metal powder layer is deposited and which serves as a base for the construction of an object, characterized in that the said plate comprises one or more recesses, the shape of which is determined so as to make the said recesses capable of receiving inserts of a given shape.

9 Claims, 3 Drawing Sheets

(56) References Cited

U.S. PATENT DOCUMENTS

2004/0191106 A1* 9/2004 O'Neill et al. .............. 419/2
2005/0112230 A1* 5/2005 Herzog ..................... 425/547

FOREIGN PATENT DOCUMENTS

| JP | 2005531692 | 10/2005 |
| WO | 2004004955 | 1/2004 |

* cited by examiner

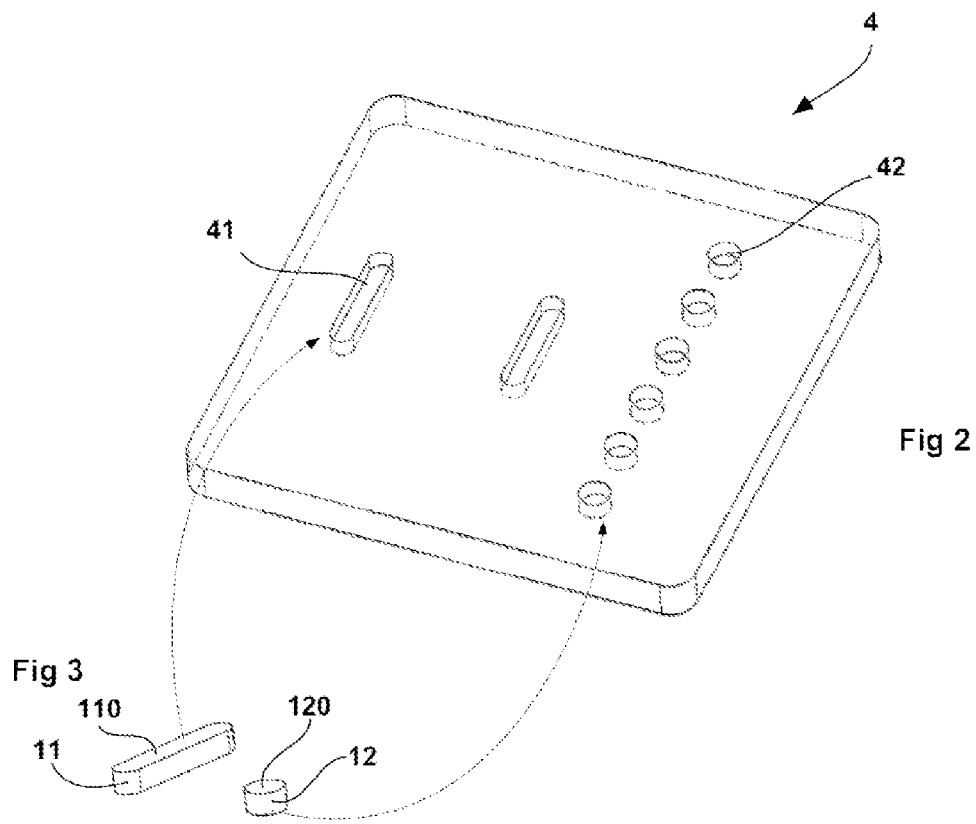
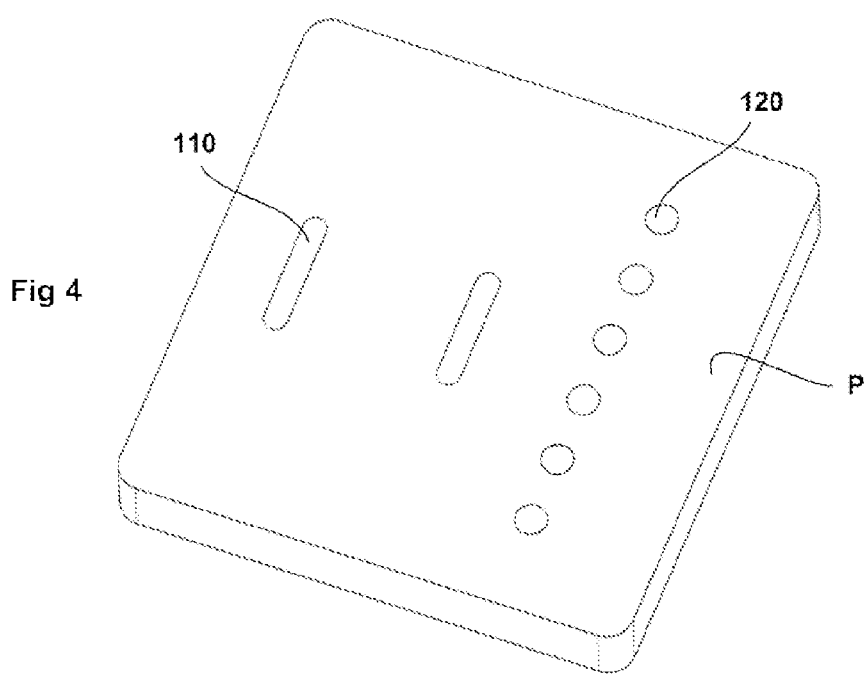

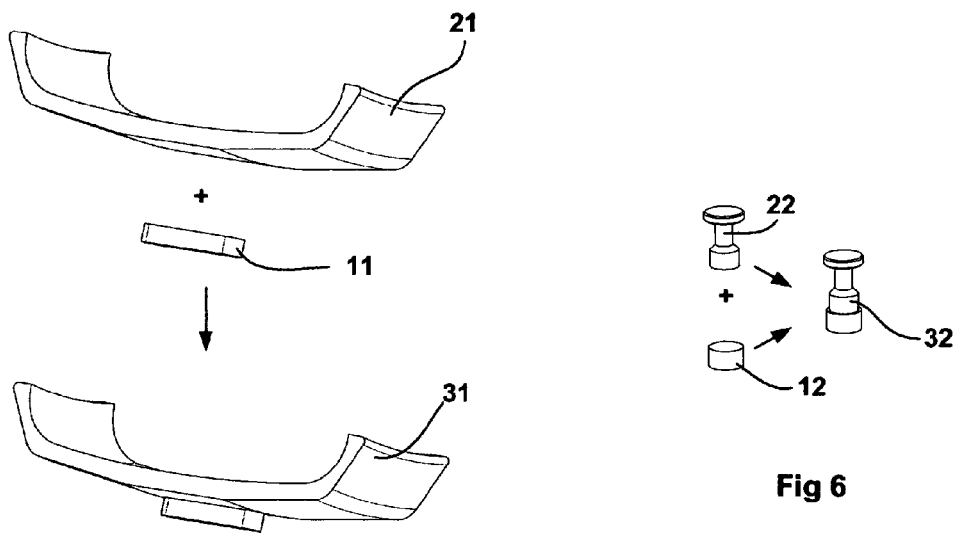
Fig 5
Fig 6
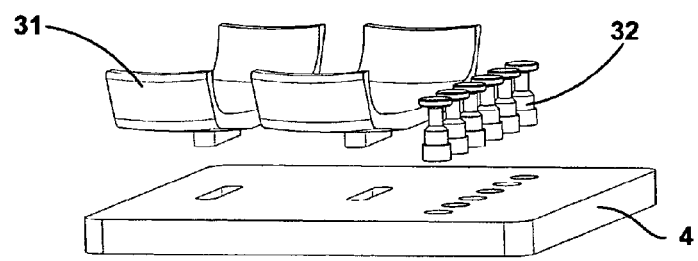
Fig 7

SUPPORTING PLATE FOR A LASER SINTERING DEVICE AND ENHANCED SINTERING METHOD

BACKGROUND

1. Field

This disclosure relates to the technical field of the manufacture of mould pieces by laser sintering of metal powders, in which objects, and more particularly mould pieces, are produced by selectively melting the powders and constructed by superposition of layers. This sintering technique is also referred to as laser sintering or SLM (Selective Laser Melting).

2. Description of Related Art

The advantage of this technique of manufacturing pieces is that the shape of the piece can be computer-modelled and the piece can be manufactured easily by sintering on the basis of this model. Specifically, the laser can be driven by a computer comprising a model of the piece, and the piece can then be manufactured by successively sintering superposed powder layers.

This technique is particularly suitable for the production of complex mould pieces because it makes it possible to manufacture moulding elements of small dimensions, such as lamellae or beadings, in the same operation.

The production of the pieces is carried out on the basis of a horizontal reference plate, on which a first metal powder layer is deposited and is selectively melted with the aid of the light beam coming from the laser source. A second metal powder layer is subsequently introduced, and then the selective melting is continued, and so on until the final piece is obtained.

The reference plate, the surface of which is planar, therefore serves as a base for constructing the object in successive layers. It is therefore not surprising to find that melting the first layer has the effect of welding the plate to the object to be produced, when the metal powder and the metal forming the reference plate have sufficiently close melting points. At the end of the operation, the reference plate then needs to be detached from the final piece, which may either be used as it is or be subjected to a finishing operation. This operation may, for example, be carried out by rapid cutting with the aid of a wire.

There remains a need in the art to exploit this feature and provide a modification of the reference plates and the manufacturing method.

Specifically, it has been found that certain pieces intended to produce curing moulds for tyres can be divided into two separate parts. A first part of the piece can undergo rapid and economical manufacture with the aid of conventional machining means, by moulding or by removing metal, such as by milling, turning or grinding, and does not have a shape which is particularly difficult to produce with the aid of these means.

The second part of the piece, however, has particular shapes which it is expedient to produce with the aid of a laser sintering device of the type above, although its cycle times are generally longer and more expensive to carry out than conventional machining devices. Thus, it is quite often the entire piece which is produced by laser sintering when the piece comprises parts which it would not be possible to produce in another way.

SUMMARY

It therefore seems advantageous to produce the piece in question in two separate steps and to divide the piece into two parts, each of which will be produced with the most suitable means.

In an embodiment, the sintering device described herein comprises a laser source, the light power of which is capable of selectively melting successive layers of metal powders, and a reference plate on which the first metal powder layer is deposited and which serves as a base for the construction of an object.

This device is characterized in that the said plate comprises one or more recesses, the shape of which is determined so as to make the said recesses capable of receiving inserts of a given shape.

In an embodiment, the method described herein for manufacturing a metal object by sintering by selectively melting successive metal powder layers with the aid of a device according to the invention comprises the steps in which:

A—metal inserts comprising a planar head are arranged in the recesses of the reference plate, the cross-sectional shape of which planar head corresponds to the cross-sectional shape of the recesses of the reference plate, so that the head of the insert is coplanar with the plane formed by the reference plate, B—a first metal powder layer of a given thickness is deposited on the reference plate, C—the first metal powder layer is selectively melted with the aid of the beam coming from the laser source, on the metal powder surface in contact with the heads of the inserts, so as to bond the head of each of the inserts to the rest of each of the objects to be manufactured.

Embodiments of the device described herein permit optimization of the manufacture of the entire piece by making it possible to obtain the first part of the piece, acting as an insert, with the aid of a conventional machining means, and to produce the second part of the piece with the aid of the laser sintering device according to the invention, while making a perfect joint between the two pieces possible in order to obtain a monobloc final piece.

Arrangements are therefore made to section the piece to be produced into two parts through a plane, so that the junction faces between the first and second parts of the piece can be inscribed in the said plane.

It is then sufficient to place the first part of the piece in that recess of the reference plate which is intended to receive it, and to arrange the junction face of the first part of the piece, forming the head of the insert, so that it is coplanar with the surface of the reference plate.

The welding between the two junction faces of the first and second parts of the piece takes place when the first metal powder layer is melted by the laser beam, and this welding is carried out over the entire junction surface between the first and second parts of the piece.

Production of the second part of the piece may be performed with the aid of the laser sintering device in a known manner.

The monobloc final piece has the same characteristics as a piece produced entirely by laser sintering. However, its production cost can thereby be reduced significantly.

BRIEF DESCRIPTION OF DRAWINGS

The following description is based on FIGS. 1 to 7, which are intended to illustrate, but not limit, the scope of the invention, and in which:

FIG. 2 represents a schematic view of an embodiment of reference plate described herein, FIG. 3 represents a schematic view of embodiments of the inserts described herein, FIG. 4 represents a schematic view of the reference plate after the inserts have been fitted, FIGS. 5 and 6 represent schematic views of embodiments of mould pieces produced with the aid of an embodiment of the method described herein, FIG. 7 represents a schematic view of an embodiment of the reference plate described herein and of the pieces after extraction from the said plate.

DETAILED DESCRIPTION OF SPECIFIC EMBODIMENTS

Figure 1:
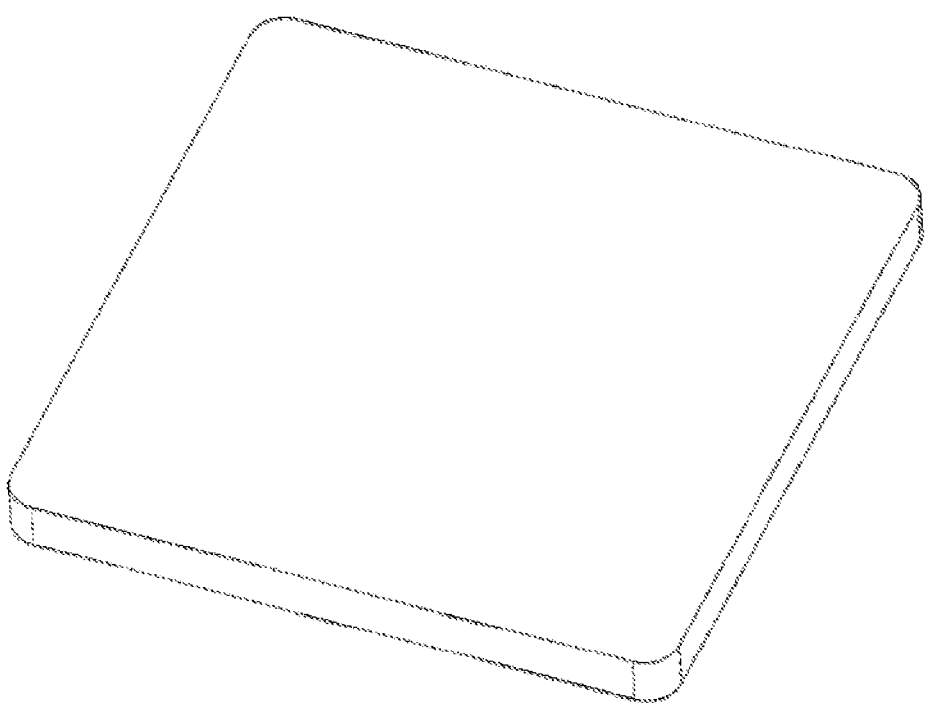
FIG. 1 represents a schematic view of a reference plate according to the prior art.

The plate represented in FIG. 1 illustrates a reference plate according to an embodiment known in the prior art. This plate has a planar reference face on which the scanning means of the laser sintering device will deposit a first metal powder layer with as constant a thickness as possible. The roughness of the reference face is adapted to facilitate bonding of this first layer.

FIG. 2 represents a reference plate 4 according to an embodiment of the invention, in which recesses 41, 42 have been formed. These recesses have a cross section corresponding to the shape of the inserts 11 and 12 represented in FIG. 3. These inserts form the first parts of the pieces to be produced. It is moreover ensured that the heads of the inserts 11 and 12 have a face, 110 and 120 respectively, which can be inscribed in a plane.

In general, the shapes of the inserts 11, 12, and therefore of the recesses 41, 42, are relatively simple. In the case of the exemplary embodiment used as a basis for the present description, for instance, these inserts have a cylindrical shape in which the generatrices of the cylinder are perpendicular to the surface 110 or 120. It is possible, however, to envisage more complex shapes and to arrange the recesses accordingly, so that the simple shapes of the inserts and recesses exemplified are not limiting of the scope of the invention.

FIG. 4 makes it possible to visualize the method according to the invention after inserts 11 and have been arranged in the recesses 41 and 42. It will be noted that the plane 110, 120 of the head of the inserts is in this case coplanar with the reference surface P of the reference plate.

In an alternative embodiment, the head of the insert may protrude from the reference surface P of the reference plate.

In another alternative embodiment, the head of the insert may lie below the reference surface P of the reference plate.

In another alternative embodiment, the opening cross section of the recesses and the cross section of the head of the insert coincide fairly precisely. This avoids powder leaks into the undesired spaces between the insert and the plate.

It is possible, but not necessary for the material of the insert to be of the same type as the metal powder used for the sintering, and this makes it possible to obtain pieces with particularly advantageous characteristics. It is merely necessary for the laser to be sufficiently powerful to melt the two metals simultaneously, in order to allow joining by welding between the two junction faces.

By way of example, a cobalt-based metal powder having a melting point of 1350° C. forms a high-quality welded joint with an iron-based insert having a melting point of 1500° C.

Specifically, in a particular embodiment it is found that the penetration depth of the laser is of the order of 80 μm. Arrangements are therefore desirably made for the powder layer not to exceed a certain thickness, for example 40 μm. The laser will then be sufficiently powerful to melt both materials simultaneously by heating them to a temperature greatly in excess of 1500°.

Once the inserts have been installed in their recesses, the operations for constructing the rest of the piece by laser sintering can be carried out in a known manner by depositing and selectively melting the successive layers.

FIGS. 5 and 6 illustrate examples of pieces which can be produced with the aid of embodiments of the method described herein. The final piece 31, 32 is divided into a first piece 11, 12, produced with the aid of suitable economical means and forming the inserts, and the second part of the piece 21, 22, produced by laser sintering.

FIG. 7 illustrates the final phase of the method according to the invention, during which the finished monobloc pieces 31 and 32 are extracted from the plate 4.

Further to the economic advantage obtained by virtue of the device and the method which have been described above, the invention can also be profited from by exploiting the better manufacturing precision of the inserts when they are obtained by machining. In particular, the inserts may constitute elements for anchoring the final piece 31, 32 in supports produced with high geometrical precision.

It will also be noted that an additional operation of cutting out the object manufactured with the support plate is avoided by virtue of the invention. Specifically, only that region of the first layer which covers the first part of the object is melted with the aid of the laser. The other regions of the first layer which are in direct contact with the support plate are not bonded to this support plate, so that these regions can be removed straightforwardly once the object has been produced.

The invention having been thus described by reference to certain specific embodiments and examples, it will be understood that these are illustrative and not limiting of the appended claims.

The invention claimed is:

1. A method for manufacturing a metal object, the object comprising a first part and a second part, said first part of the object being manufactured before said second part of said object, the manufacturing method comprising:
   inserting the first part of the object into at least one recess of a reference plate,
   manufacturing the second part of the object with the aid of a laser beam by selectively melting successive metal powder layers, comprising:
      depositing a first metal powder layer on the reference plate, wherein said first layer has a predetermined thickness so that the first part of the object is covered by a region of said first layer,
      selectively melting the first layer by directing the laser beam only onto that region of the first layer which covers the first part of the object, so as to bind the metal powder of the said region to the said first part of the object,
      producing the rest of the second part of the object by selectively melting other metal powder layers,
   wherein said laser has a penetration depth of the order of 80 μm.

2. The manufacturing method according to claim 1, wherein the first part of the object comprises a planar head, the cross-sectional shape of which corresponds to the cross-sectional shape of the recess of the reference plate, so that the head of the first part of the object is coplanar with a plane formed by the reference plate.

3. The manufacturing method according to claim 1, further comprising adjusting the power of the laser so that the laser beam is capable of simultaneously melting the metal forming the first part of the object and the first metal powder layer.

4. The manufacturing method according to claim 1, further comprising adjusting the thickness of the first metal powder layer so that the laser beam is capable of simultaneously melting the metal forming the first part of the object and the first metal powder layer.

5. The manufacturing method according to claim 4, wherein the laser beam heats metal forming the first part and the first metal powder layer to a temperature in excess of 1500° C.

6. The manufacturing method according to claim 1, wherein said first part is an iron-based insert having melting point of 1500° C.

7. The manufacturing method according to claim 1, wherein said first metal powder layer is a cobalt-based metal powder having a melting point of 1350° C.

8. The manufacturing method according to claim 1, wherein said first metal powder layer is deposited to a thickness that does not exceed 40 μm.

9. The manufacturing method according to claim 1, further comprising removing the metal object from the reference plate without cutting.

* * * * *